United States Patent [19]
Coho et al.

[11] 3,792,666
[45] Feb. 19, 1974

[54] RAILWAY TRUCK MOTOR SUSPENSION

[75] Inventors: Owen C. Coho; Malcolm W. Waite, both of Erie, Pa.

[73] Assignee: General Electric Company, Erie, Pa.

[22] Filed: Aug. 4, 1972

[21] Appl. No.: 278,002

[52] U.S. Cl................. 105/136, 105/108, 105/139, 105/140
[51] Int. Cl.......... B61c 3/00, B61c 9/36, B61c 9/48
[58] Field of Search ... 105/133, 135, 136, 137, 108, 105/139, 140, 96.1; 180/62, 65 F

[56] References Cited
UNITED STATES PATENTS

| | | | |
|---|---|---|---|
| 3,152,558 | 10/1964 | Mueller | 105/133 |
| 2,023,846 | 12/1935 | Levin | 105/137 |
| 556,893 | 3/1896 | Lundgv | 105/136 |
| 2,023,856 | 12/1935 | Sanders | 105/136 X |
| 2,039,513 | 5/1936 | Baker | 180/65 F |
| 2,742,864 | 4/1956 | Enyart | 105/136 |
| 3,027,959 | 4/1962 | Mailliard | 180/62 X |
| 3,244,117 | 4/1966 | Yuhas | 105/96.1 |
| 3,286,656 | 11/1966 | Lich | 105/133 X |

Primary Examiner—Gerald M. Forlenza
Assistant Examiner—Howard Beltran
Attorney, Agent, or Firm—Dana F. Bigelow; Walter C. Bernkof

[57] ABSTRACT

A rail vehicle drive assembly having an a-c motor whose rotor is rigidly coupled to and overhung from the pinion of a gear train operably connected to drive the axle. The motor stator is likewise integrally overhung from a gear train housing journaled to the axle, and the combination is flexibly mounted to the vehicle truck. Advantages include the obviation of the flexible couplings, rotor bearings, and axle support of the motor, by direct connection thereto.

9 Claims, 2 Drawing Figures

RAILWAY TRUCK MOTOR SUSPENSION

BACKGROUND OF THE INVENTION

This invention relates generally to rail vehicular drive systems and more particularly to the electric motor drive of a vehicle axle through a gear train.

Railway vehicles such as locomotives and transit cars are commonly propelled by an electric motor driving an axle through spur reduction gearing. The motor is mounted between the axle wheels in parallel drive relation to, and offset from the axle, either upwardly or longitudinally or both, with support connection made from the motor to the vehicle truck structure.

Generally, in locomotive applications a large heavy duty traction motor is mounted directly to the axle by sleeve bearings and to the truck by a resilient nose suspension. Overhung from the motor armature is a pinion gear operably engaging a spur gear to drive the axle. In such a system the principal support of the motor is provided by the sleeve bearings, which are quite adequate at low and moderate speeds.

In propulsion systems adapted for higher speeds, such as in transit car applications, the sleeve bearings are undesirable for several reasons, most important of which is their inability to dissipate the generated heat, and to withstand the axial thrust produced by reaction to helical gearing. Replacement of spur gears with helical gears was introduced to prevent excessive noise at high speeds. Also contributing to the problem of undesirable noise is that of gear misalignment occasioned by the heavy loads. Thus, at higher speeds, positive location of gearing is required to obtain the desired precision in the gear train.

The requirements encountered in high speed systems are commonly met by the use of anti-friction bearings to replace the aforementioned sleeve bearings. In addition to solving the problems discussed hereinabove, the anti-friction bearings are much lighter and are therefore more readily adapted to use on high speed vehicles. Anti-friction bearings are now being employed in place of sleeve bearings on some locomotive drive systems, thereby alleviating some of the bearing problems discussed hereinabove which are occasional by high speed operation. Generally, they are placed one on each end of the motor, as are the sleeve bearings. Such a mounting however, must allow for the flexing of the axle, a consideration which may be serious when the bearings are widely spaced and high loads are involved.

In high speed transit applications, such an approach is therefore avoided, and a closer bearing placement is provided. Typically, a pair of tapered roller bearings are employed to rotatably mount the gear housing structure to the axle, with the housing being rotationally stabilized by flexible attachment to the vehicle truck. Motor support is provided by a similar attachment to the truck, and possibly by additional attachment to the gear housing, the axle, or both. Unlike the aforementioned overhung pinion arrangement, wherein the pinion is not journaled but forms an integral extension of the journaled rotor, both the pinion and armature are journaled, with each one being mounted between its own pair of bearings. Bearing alignment is critical with such a design and if attained, it is difficult to maintain; therefore, a flexible coupling is provided between the armature and the pinion to allow for misalignment of the two shafts.

Although the flexible coupling may provide the answer to the misalignment phenomena, it is the cause of other difficulties which may make its use undesirable. Its proper assembly is critical, and if not performed correctly, a failure is likely to occur. Furthermore, the coupling must be disassembled whenever the motor armature is removed for maintenance purposes, a fact that increases the likelihood of its subsequently being assembled incorrectly. Improper assembly is occasioned by improper fit of the hubs on the respective shafts (typically splined or tapered) or by improper joining of the hubs.

It is therefore an object of this invention to provide an improved motive drive arrangement for high speed rail vehicles.

Another object of this invention is the provision in a high speed rail vehicle for a light weight drive assembly to be coupled to the vehicle axle.

Yet another object of this invention is the provision for positive location of precision gears coupling a traction motor to the axle of a rail vehicle.

Still another object of this invention is the provision for the elimination of a flexible coupling between the motor rotor and the drive pinion of a rail vehicle drive system.

A further object of this invention is the provision for a single pair of bearings to support both the motor rotor and the associated pinion of the drive system.

Yet another object of this invention is the provision for flexibility between a rail vehicle axle and its associated truck.

Still another object of this invention is the provision for a high speed rail vehicle drive assembly which is economical to manufacture, as well as functional and durable in use.

These objects and other features and advantages become more readily apparent upon reference to the following description when taken in conjunction with the appended drawings.

SUMMARY OF THE INVENTION

This invention achieves the stated objectives by overhanging a traction motor from a gear drive assembly journaled to the axle of a traction vehicle. The motor stator is rigidly connected to the gear housing, and the motor rotor is integrally connected to and overhung from the high speed pinion gear. Bearings straddle the pinion gear and comprise the only support for the motor rotor cantilevered from the pinion.

Such an arrangement is made possible by the use of a relatively small light weight a-c induction motor for providing motive power to the vehicle. Flexibility is provided between the vehicle truck and the relatively rigid combination of motor, gear unit, and axle, by a flexible coupling therebetween, connection being made to either the motor or the gear housing. No flexibility is required between the axle and the motor as in the case of a d-c motor having a commutator and brushes.

The subject drive assembly is an integral unit, which is simpler, lighter weight, less expensive and much more compact than conventional arrangements.

In the drawings as hereinafter described a preferred embodiment is depicted; however, various other modifications and alternate constructions can be made thereto without departing from the true spirit and scope of the invention.

DESCRIPTION OF THE PREFERRED EMBODIMENT

Figure 1:
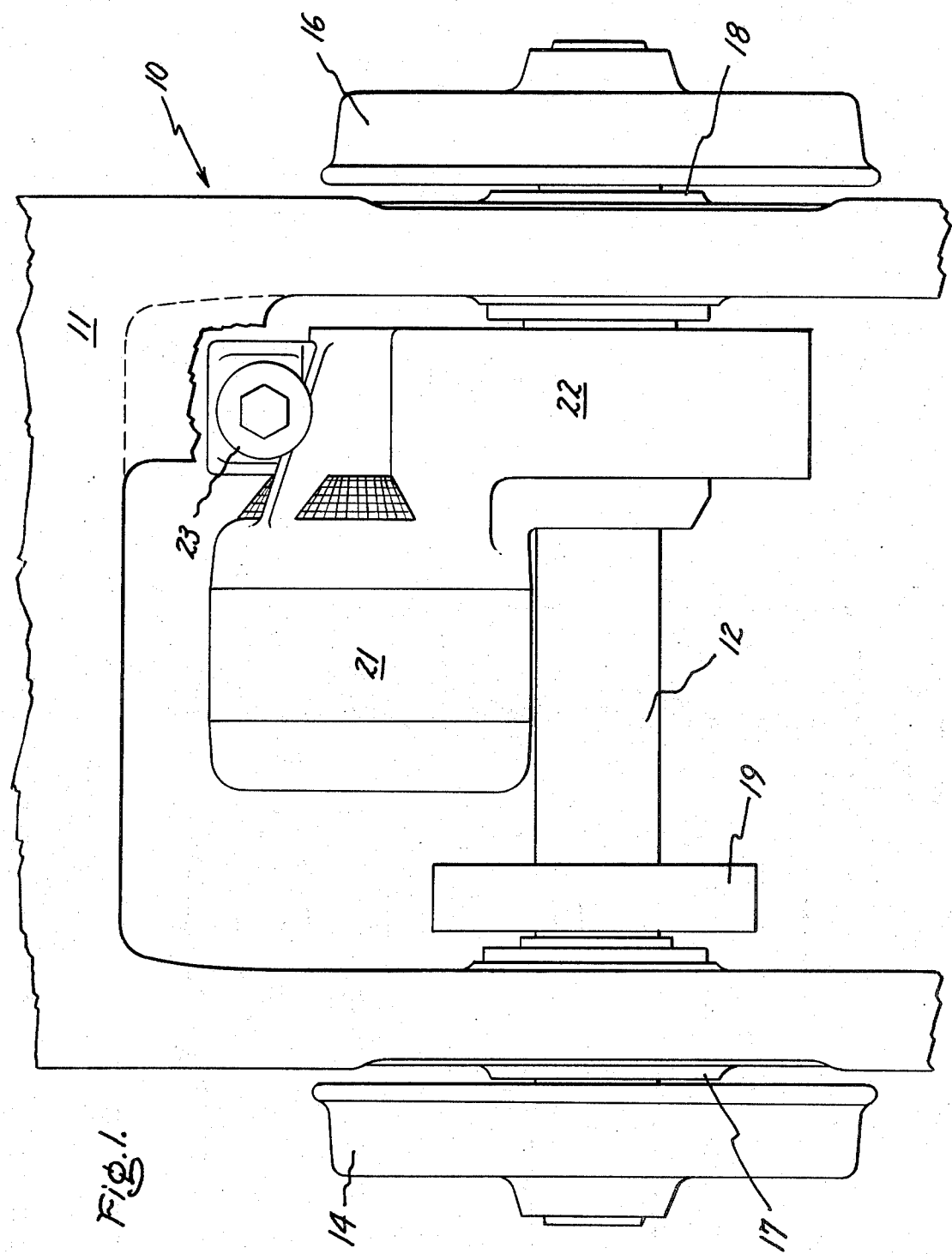
FIG. 1 shows a top plan view of the propulsion drive arrangement as constructed in accordance with the principles of the invention.

Reference is now made to FIG. 1 wherein the subject drive arrangement is shown generally at 10. A truck frame 11 is supported by a pair of axles 12 and 13, (only one shown) each of which is provided with a pair of flanged wheels 14 and 16 spaced appropriately for frictional engagement with spaced tracks (not shown). Mounted on the truck frame 11 is a car body (not shown) cushioned in a conventional manner, such as by springs, pads, or the like, disposed between the truck and body. Journal boxes 17 and 18 are commonly provided to allow for rotation of the axles within the truck frame, and generally provide a degree of resiliency therebetween to allow for vibration of the axles relative to the truck frame. As will be shown hereinafter a considerable space savings inherent in the subject design arrangement allows application to trucks having either outside or inside journal suspension systems. Furthermore, the additional space allows for the installation of a friction brake 19, such as a disc-type brake to be operably connected to the axle in the manner shown.

Motive power is provided to the axle 12 by an electric motor 21 operating a gear drive system 22 mechanically connected to the axle. Rigid interconnection is made both between the axle and gear drive system and between the gear drive and the motor 21. A resilient interconnection 23 is provided between the motor - gear drive combination and the truck frame 11, the connection being made at either the gear box as shown, or alternatively at the motor.

Figure 2:
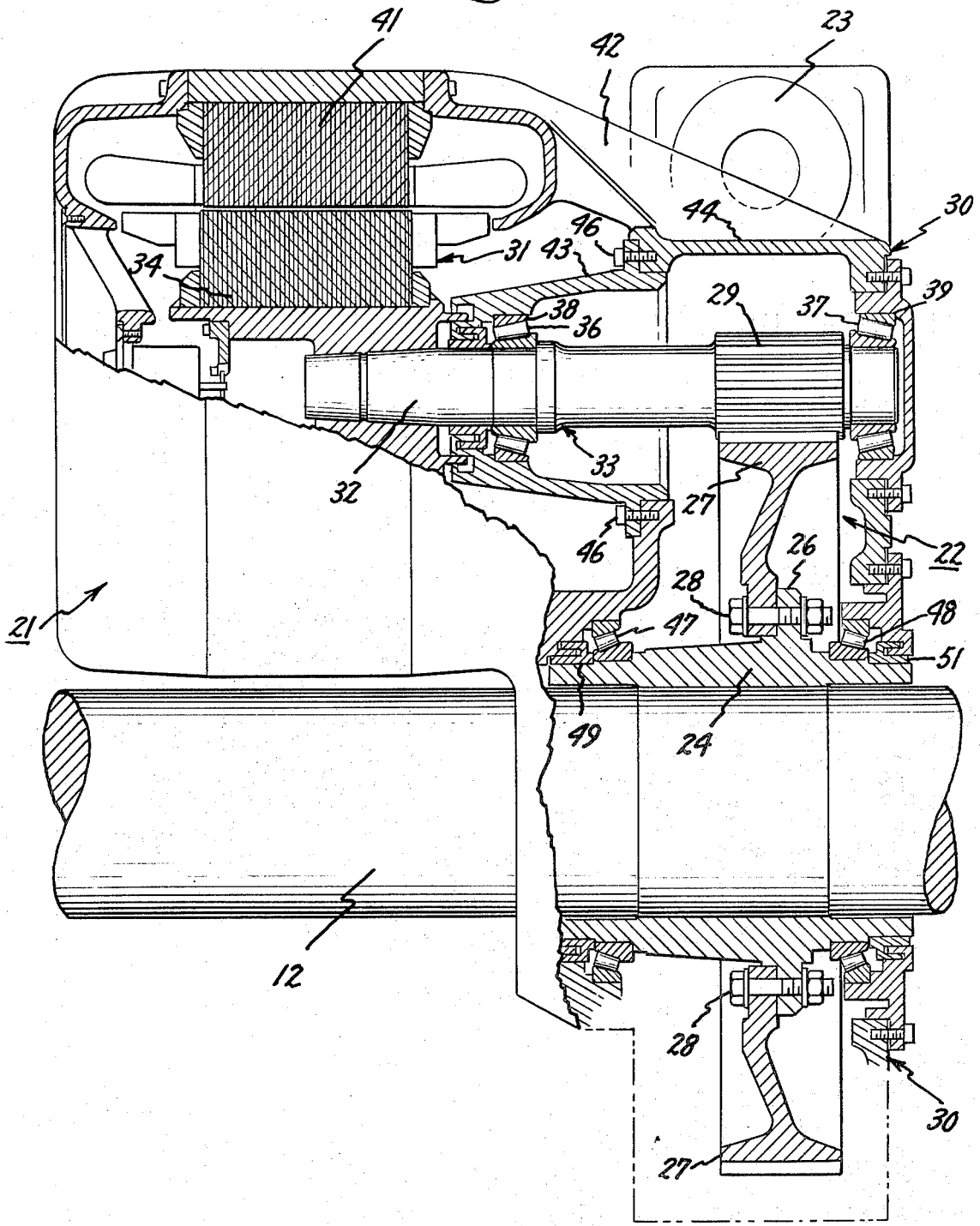
FIG. 2 is a partial cross section thereof showing the internal structure embodied therein.

For a more detailed discussion of the assembly reference is now made to FIG. 2 wherein the connection and support elements are more clearly shown.

The sole connection made between the drive assembly and the axle 12 is by a hub 24 which is rigidly secured to the axle proximate its one end. The manner of attachment is typically accomplished by shrinking the hub on the axle to form an integral unit. Projecting radially outward from the hub is a flange 26 to which is attached a gear 27 of the conventional type, attachment being made by a plurality of studs 28 placed in arcuately spaced holes formed in the flange 26. This spur gear directly drives the axle by operational engagement with a meshing pinion gear 29. Although not shown in the preferred embodiment, one or more reduction gear phases may be provided between the high speed pinion 29 and the spur gear 27. A gear housing assembly 30 surrounds the gear train and is attached to the hub 24 as will hereinafter be described.

Motive power is delivered directly to the pinion 29 by the motor rotor 31 whose shaft 32 is disposed in parallel relationship with the vehicle axle 12. This invention is facilitated by the use of an a-c motor, and preferably an a-c motor of the induction type, wherein the relatively light weight, high speed rotor can be overhung from its associated pinion gear. A rigid connection is provided between the rotor shaft 32 and the pinion 29, with the rotor being overhung from the pinion in a cantilever fashion. A preferred arrangement is to have an integral shaft 33 as shown, wherein the rotor body 34 is shrunk-fit to the rotor end thereof.

Support for both the pinion 29 and the rotor 31 is provided by a single pair of bearings 36 and 37, those shown being of the tapered roller type, disposed one on each end of the pinion so as to straddle it. The associated bearing outer races 38 and 39 are integral with the gear housing structure 30 as shown.

The above described bearing arrangement provides cantilever support for the overhung motor rotor which transmits pure torque, and reaction support to the pinion which is subjected to heavy radial loads from the spur gear 27. The requirement for separate pairs of bearings for each of the rotor and pinion, as is required in conventional systems, is thus eliminated. Even more important, since the shafts form an integral unit and are supported by a single pair of bearings, the problem of axial alignment is eliminated and the relative flexibility, which was heretofore provided by a troublesome flexible coupling, can also be eliminated. Thus, a considerable space savings is made as well as the reducing of maintenance problems occasioned by flexible couplings and bearing and their associated components such as seals, housings, sleeves, bearing nuts, etc.

In addition to providing support for the motor rotor 31, the gear housing assembly 30 also provides structural support for the motor stator 41. The stator 41 is rigidly secured to the housing assembly 30 so as to be completely supported thereby. Various methods of attachment may be used; however, the preferred method is that of forming an integral shell as shown, by the use of bridging support element 42. Assembly and disassembly is facilitated by the securing of articulated components 43 and 44 by means such as by studs 46.

Thus, the motor electrical air gap is maintained between the rotor and stator by the rigid connection to the pinion gear and associated housing, respectively, which provide complete structural support therefor. As stated hereinbefore the pinion gear derives support from a pair of bearings disposed in the gear housing assembly 30. This assembly in turn is journaled to the hub 24 by a second pair of tapered roller bearings 47 and 48. The axial spacing thereof is sufficiently great to ensure proper support for the moment arm forces of the cantilevered motor, and yet narrow enough to not be seriously affected by a flexing of the axle 12. A pair of associated seals 49 and 51 are provided between the housing 42 and hub 24 to ensure the integrity of the gear train.

Torque reaction of the housing to motive force is offset by the resilient interconnection 23 secured to the truck frame 11. The flexibility inherent therein allows for relative movement of the entire assembly with respect to the truck, and comprises the sole means of resiliency between the motor-gear assembly and the truck. The integral assembly is thus simple, light and compact, and lends itself to application on high speed light weight transit systems.

What we claim as new and desire to secure by Letters Patent of the United States are:

1. A drive assembly for rail vehicles of the type having a body mounted on a truck having a journaled axle and associated rail engaging wheels, the assembly comprising:

a. gear drive means connected to the axle for operative rotation thereof;

b. a housing encasing said gear drive means and rotatably mounted to the axle;

c. a drive motor operably connected to said gear drive means, the stator of said motor deriving its sole support from a rigid connection between its one end thereof and said housing, and the rotor thereof deriving its sole support from a rigid coupling of its shaft to said gear drive means; and d. a connection between said housing and the truck, said connection providing support for said housing and a reaction to the driving torque said connection being substantially in the plane of the gear drive means.

2. A drive assembly as set forth in claim 1 wherein said gear drive means includes a pinion gear with which the shaft of said rotor is axially aligned and rigidly connected to so as to form an extension thereof and derive support therefrom.

3. A drive assembly as set forth in claim 2 where the pinion gear and the shaft of said rotor comprise an integrally formed unit.

4. A drive assembly as set forth in claim 2 and including journal means disposed in said housing for rotational engagement with and support of said pinion gear.

5. A drive assembly as set forth in claim 4 wherein said journal means comprises a pair of tapered roller bearings axially spaced proximate opposite ends of said pinion gear.

6. A drive assembly as set forth in claim 1 wherein said gear drive means includes a spur gear rigidly mounted to the axle and drivably engaged with said spur gear.

7. A drive assembly as set forth in claim 1 wherein said housing is rotatably mounted to the axle by a pair of axially spaced roller bearings disposed therebetween.

8. A drive assembly as set forth in claim 1 wherein said housing and the stator of said motor comprise a single integral unit.

9. A drive assembly as set forth in claim 1 wherein said gear drive means is rigidly connected to the axle and further wherein said connection between said housing and the truck is flexible so as to provide resiliency therebetween.

* * * * *